(12) United States Patent
Wong et al.

(10) Patent No.: US 9,280,450 B2
(45) Date of Patent: Mar. 8, 2016

(54) METHOD AND APPARATUS FOR PRODUCING REGULATORY-COMPLIANT SOFTWARE

(71) Applicant: Medidata Solutions, Inc., New York, NY (US)

(72) Inventors: Isaac Wong, New York, NY (US); Anthony Hewer, Canterbury (GB); Johnlouis Petitbon, Brooklyn, NY (US); Glen de Vries, New York, NY (US)

(73) Assignee: Medidata Solutions, Inc., New York, NY (US)

( * ) Notice: Subject to any disclaimer, the term of this patent is extended or adjusted under 35 U.S.C. 154(b) by 81 days.

(21) Appl. No.: 13/781,970

(22) Filed: Mar. 1, 2013

(65) Prior Publication Data

US 2014/0250427 A1    Sep. 4, 2014

(51) Int. Cl.
  *G06F 9/44* (2006.01)
  *G06F 11/36* (2006.01)

(52) U.S. Cl.
  CPC .................................. *G06F 11/3664* (2013.01)

(58) Field of Classification Search
  None
  See application file for complete search history.

(56) References Cited

U.S. PATENT DOCUMENTS

| | | | | |
|---|---|---|---|---|
| 8,200,634 B2* | 6/2012 | Driesen et al. | ................ | 707/641 |
| 8,266,578 B2* | 9/2012 | Bazigos | .................... | G06F 8/20 709/221 |
| 2006/0095309 A1* | 5/2006 | Mangan | ................ | G06Q 10/00 717/123 |
| 2007/0136814 A1* | 6/2007 | Lee et al. | ......................... | 726/25 |
| 2007/0136817 A1* | 6/2007 | Nguyen | .......................... | 726/26 |
| 2007/0169108 A1* | 7/2007 | Guillorit | ............. | G06F 9/44521 717/174 |
| 2008/0016214 A1* | 1/2008 | Galluzzo et al. | .............. | 709/226 |
| 2008/0178144 A1* | 7/2008 | Bazigos | .............. | G06F 11/3604 717/101 |
| 2008/0201098 A1* | 8/2008 | manfredi | ....................... | 702/108 |
| 2009/0172773 A1* | 7/2009 | Moore | ................ | 726/1 |
| 2009/0282489 A1* | 11/2009 | Cockerille et al. | .............. | 726/26 |
| 2010/0088281 A1* | 4/2010 | Driesen et al. | ................ | 707/641 |
| 2011/0004565 A1* | 1/2011 | Stephenson et al. | .......... | 705/348 |
| 2012/0005241 A1* | 1/2012 | Ortel | ............................. | 707/803 |
| 2012/0278900 A1* | 11/2012 | Sebald | ............................ | 726/28 |
| 2012/2778900 | * | 11/2012 | Sebald | ............................ 726/28 |
| 2013/0232474 A1* | 9/2013 | Leclair | ..................... | G06F 9/44 717/134 |
| 2013/0339510 A1* | 12/2013 | Douglas et al. | ............... | 709/223 |
| 2014/0026131 A1* | 1/2014 | Ravi | .................... | G06F 9/44505 717/177 |
| 2015/0193332 A1* | 7/2015 | Sebald | .................. | G06Q 10/06 717/126 |

* cited by examiner

*Primary Examiner* — Isaac T Tecklu
(74) *Attorney, Agent, or Firm* — Steptoe & Johnson LLP; Robert Greenfeld

(57) ABSTRACT

A method for producing regulatory-compliant software includes validating a software application and freezing the validated software application in a validation portal, proving-in an infrastructure on which the software application operates, and providing evidence of operational change management for a regulatory agency, which evidence comprises documentation that satisfies the agency's compliance rules. A regulatory-compliant software package is also described.

18 Claims, 4 Drawing Sheets

METHOD AND APPARATUS FOR PRODUCING REGULATORY-COMPLIANT SOFTWARE

BACKGROUND

Providing software for services governed by a regulatory body may require adhering to a number of requirements that do not exist outside of the regulatory environment. Indeed, the cost (for example, in terms of money, time, or experience) of complying with such requirements often keeps some software suppliers from providing software to regulated markets.

The life sciences area is no exception. Regulatory markets involving, for example, clinical trials, toxicology, or environmental protection are often governed by regulatory bodies such as the FDA (Food and Drug Administration) or the EPA (Environmental Protection Agency) in the United States, and similar bodies in other countries. These agencies typically promulgate regulations that have the effect of making it difficult for software suppliers to provide software. For example, they may be unfamiliar with the regulations or may not have the infrastructure to provide software that complies with such regulations, and acquiring or developing such infrastructure may be too cost prohibitive.

In the clinical trials area, regulatory requirements coupled with legacy practices can make performing clinical trials difficult. Some of the legacy practices include submitting clinical trial results to regulatory authorities in paper form. One way that life sciences companies that perform clinical trials have tried to reduce their expense is to use software programs that make some submissions electronically. Regulatory authorities have promulgated rules and recommendations governing such electronic submissions, including electronic records and electronic signatures. In the United States, the FDA's rules that govern electronic records and electronic signatures are found in 21 CFR Part 11, which is designed to ensure that the electronic submissions are "trustworthy, reliable, and generally equivalent to paper records and handwritten signatures executed on paper." 21 CFR §11.1. According to the FDA's Guidance for Industry regarding Part 11, Electronic Records; Electronic Signatures—Scope and Application (August 2003), "Part 11 applies to records in electronic form that are created, modified, maintained, archived, retrieved, or transmitted under any records requirements set forth in Agency regulations. Part 11 also applies to electronic records submitted to the Agency under the Federal Food, Drug, and Cosmetic Act (the Act) and the Public Health Service Act (the PHS Act), even if such records are not specifically identified in Agency regulations (§11.1)." The FDA has also provided other guidance related to software, for example, in its General Principles of Software Validation; Final Guidance for Industry and FDA Staff (January 2002).

Software suppliers may desire to offer software programs or applications to lessen the expense of clinical trials in particular, and to improve performance in other regulatory areas. But the information generated by these software programs, in addition to satisfying the regulatory agencies' requirements related to the data themselves and the processes followed to collect the data, must abide by those requirements. Navigating these requirements can be laborious, and making sure that software is compliant often dissuades suppliers from generating regulatory solutions.

Figure 1A:
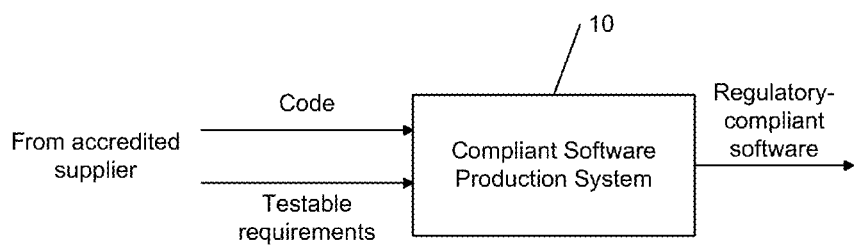
FIGS. 1A-1C are various detailed block diagrams of a compliant software production system according to embodiments of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Embodiments of the present invention may be used in a variety of applications. For example, the techniques disclosed herein may be used in or with software in a variety of fields, clinical drug or device studies, and other projects in which software suppliers desiring to offer software solutions submit their software to a third-party compliance provider to ensure the software complies with regulations. A specific example may be in the field of custom metal-works manufacturing or custom orthodontic labs in which a practitioner may send a mold to a lab, the mold may then be used to make a device or object subject to quality control, and then the lab may test the mold pursuant to regulations and quality systems prior to returning it to the practitioner, a patient, or a customer.

In this specification, a "regulatory system" or "regulatory body" or "regulatory agency" means any type of rules-based system or rules-generating body, and is not limited to legal or law-based systems or bodies such as the FDA, EPA, or other governmental approval organizations. For example, a regulatory system, regulatory body, or regulatory agency could be a certification authority, a standard-setting organization, or other public or non-public organization that issues rules or requirements that software suppliers may desire to follow. Likewise, terms such as "rules," "regulations," and "requirements" may be used interchangeably. Also, the terms "software supplier" and "software application supplier" are used interchangeably in this specification and claims.

Software applications designed for regulatory systems are often required to be compliant with the various requirements of such systems. Compliance may mean that the software applications are (1) validated, (2) deployed in a validated fashion, e.g., proving-in that the application as deployed is in fact the application that was actually validated; (3) audited, including that those audits are tracked in a compliant fashion; and/or (4) monitored to ensure that the validated status is maintained. Of course, specific requirements are dependent on the situation—this is not intended to be limiting.

The present invention may be used to automate and prove compliance of software applications, including but not limited to those of smaller software suppliers who may lack the resources and knowledge to validate their own applications. It may also be used to open the regulatory software market to more regulatory software solutions. The techniques described herein may also create a standard or seal of approval in the specific regulatory industry for regulatory software compliance.

Figure 1B:
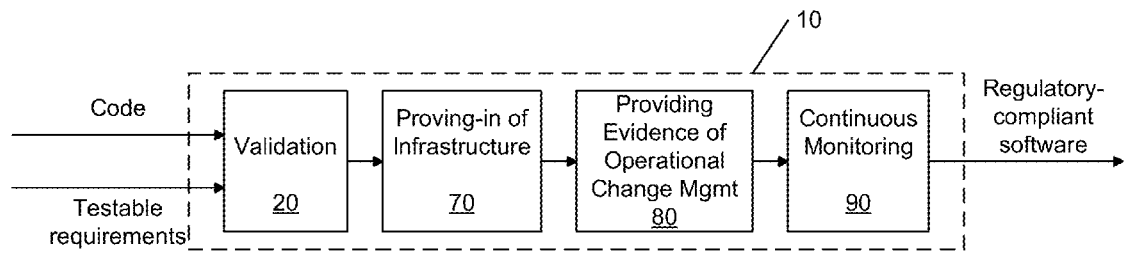
Figure 1C:
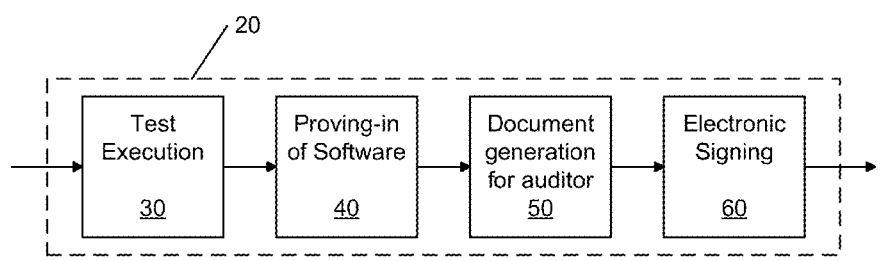

Reference is now made to FIGS. 1A-1C, which are various detailed block diagrams of a compliant software production system according to embodiments of the present invention. Broadly speaking, in FIG. 1A, a software application supplier, which may be a software vendor or regulatory software developer, may provide non-compliant software code and testable requirements to compliant software production system 10, and compliant software production system 10 may produce regulatory-compliant software. Some regulatory systems may require that the software application supplier be accredited, e.g., that there be evidence of the supplier's (or the supplier's employees') education, training, or experience. Thus, in some embodiments, and depending on the compliance regulations, the software application supplier may already be accredited by, or confirmed to have appropriate accreditation by, the regulatory body, but in other embodiments, such accreditation may be performed by or confirmed by a compliant software producer. FIG. 1B shows that in one embodiment, compliant software production system 10 may be made up of one or more of four main blocks, validation block 20, a block for proving-in the infrastructure 70, a block to provide evidence of operational change management 80, which may include providing a regulatory-compliant audit trail, and a continuous monitoring block 90, which may ensure continued compliance with regulatory requirements such as response time, maintainability, and execution time. FIG. 1C shows that in one embodiment, validation block 20 may be made up of one or more of four blocks, test execution 30, proving-in of software 40, document generation for an auditor 50, and electronic signing 60.

Figure 2:
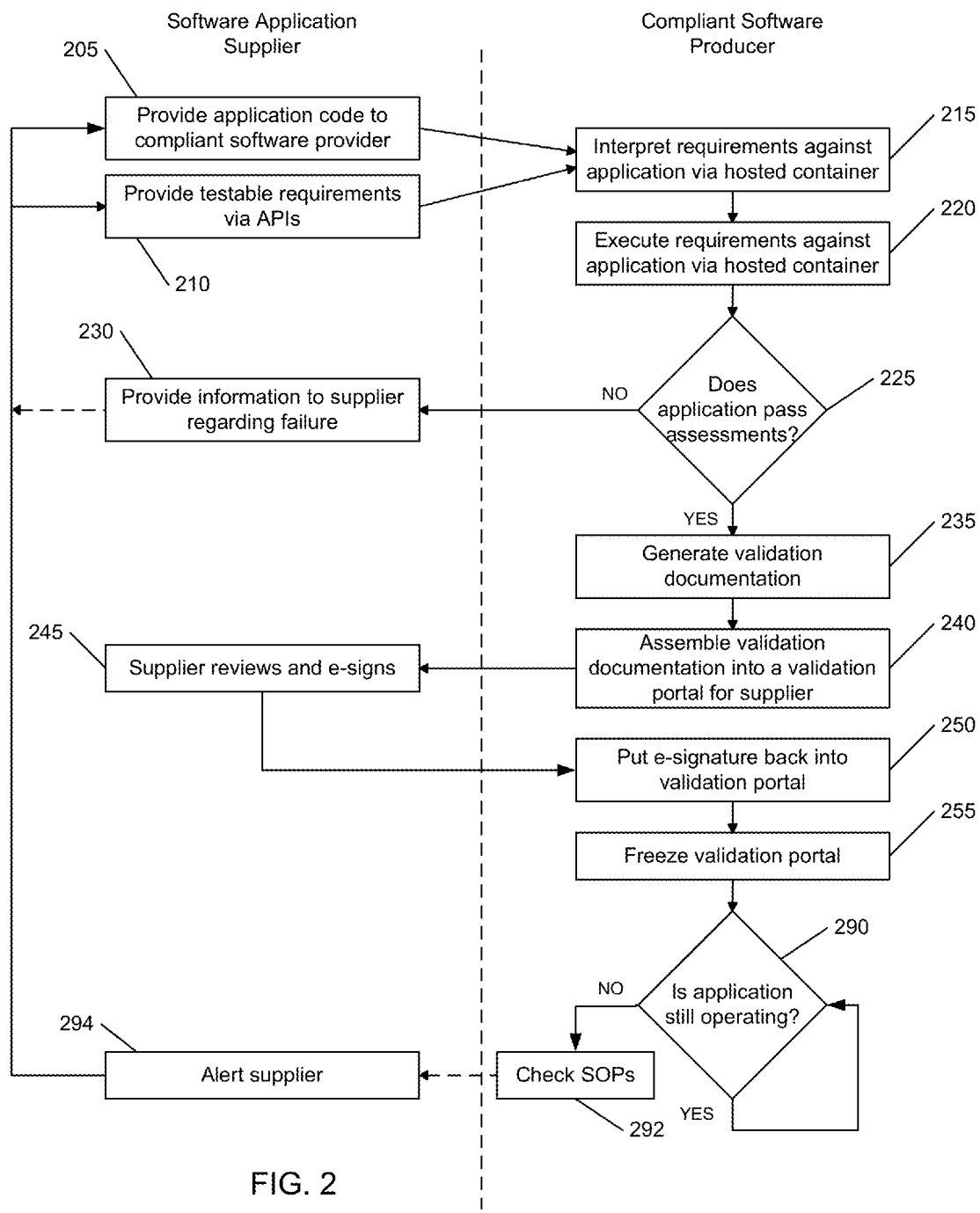
FIGS. 2-4 are flowcharts illustrating various embodiments of the present invention.
Figure 3:
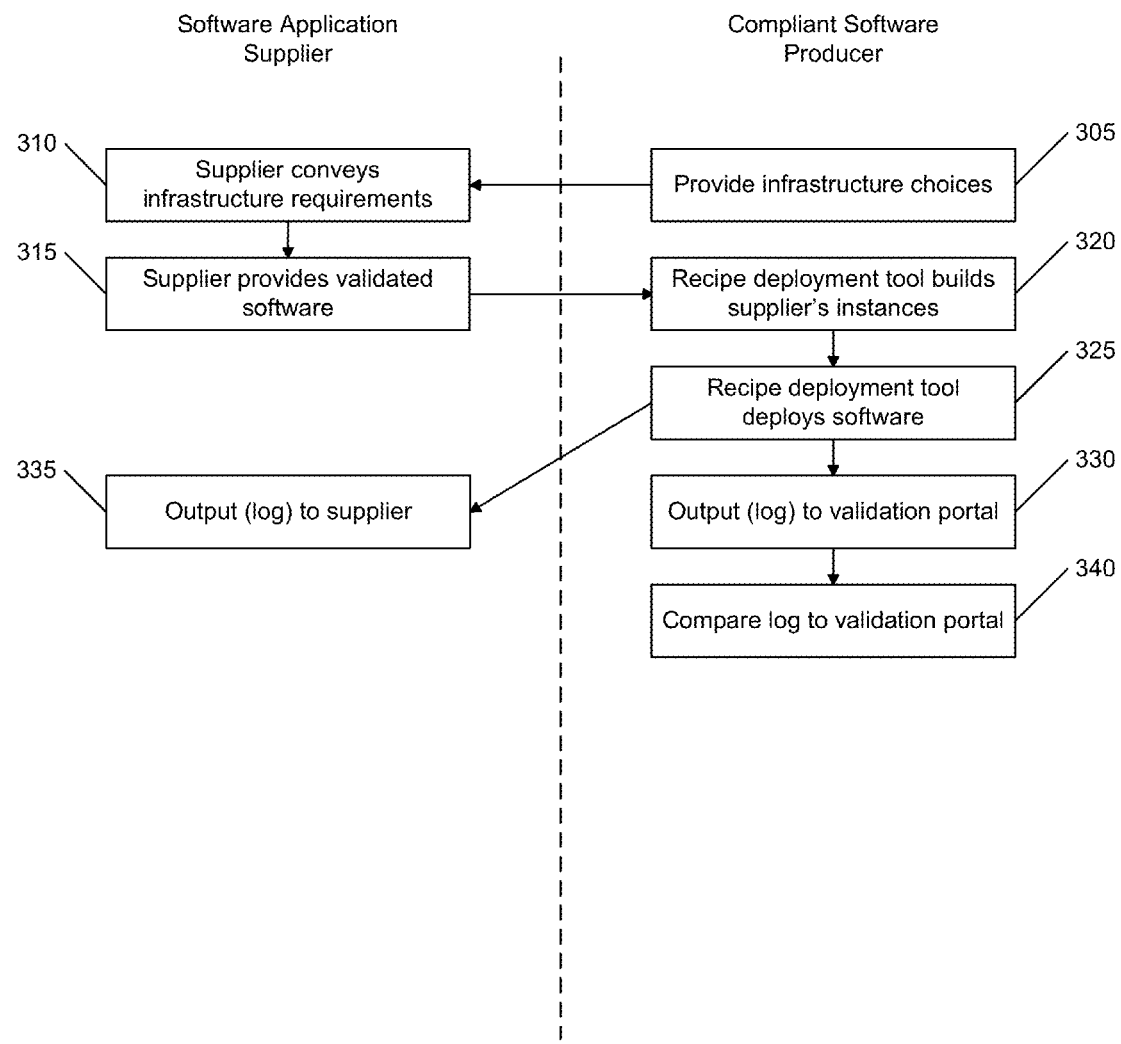
Figure 4:
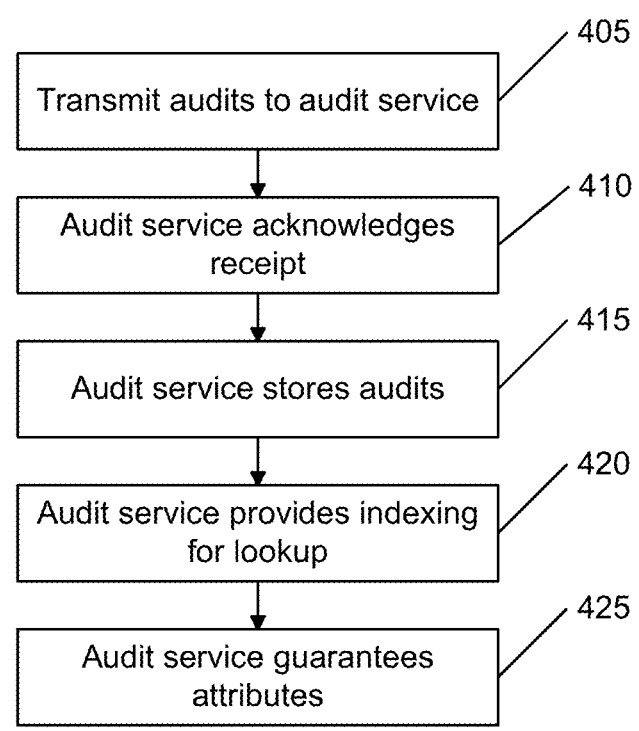

FIGS. 2-4 are flowcharts illustrating various embodiments of the present invention. FIG. 2 is a flow diagram illustrating how a compliant software producer may validate and continuously monitor a software application supplier's software application according to an embodiment of the present invention. The supplier may develop a regulatory software application in any computer language. The application may, for example, be web-based or may operate in standalone mode on a variety of devices, such as mainframe, personal, or laptop computers, personal digital assistants (PDAs), tablet computers, cellphones, etc. In some instances, the application may be a service application that is not designed to interact with a user, but rather with other software. The supplier may also create testable requirements (which some may call scenarios), for example, in a human-readable format, that describe how its application may perform. Such testable requirements may also be known as scripts and may be written in a widely-used scripting language such as Cucumber. For example, a script may reflect that there should be two text-entry boxes on the login screen and, if a login fails, the next screen will display "login fail." Or a requirement may be that for a given screen, selection of certain options will bring a user to a certain screen, whereas selection of other options would bring the user to another screen.

In operation 205, the software application supplier may provide its application or source code to the compliant software producer, which may host the code and/or application in a hosted container, which may be a type of development or testing environment. In operation 210, the supplier may also provide to the compliant software producer via API (application programming interfaces) the testable requirements for the application as discussed above. These inputs from the supplier may be digitally signed so that the compliant software producer knows that they have come from a particular software application supplier and have not been tampered with. In cases where this is not the first submission from a software application supplier, such as if the tests fail in operations 225 or 290 below, the digital signature may inform the compliant software producer that the corrected code comes from the same supplier. In operations 215 and 220, the compliant software producer may use browser automation tools such as the Ruby programming language to run automated tests on the application to assess various functional requirements. These automated tests may interpret and execute the testable requirements against the supplier-provided application via the hosted container. Execution of the automated tests may be used, for example, to ensure that the application does what it claims to do. This may include automated tests that verify that the application behaves as specified. Such tests may include, but are not limited to, performance tests, review of design documents, installation qualification, operational qualification, performance qualification, code review for sufficient use of code styles, code coverage, cyclomatic (or conditional) complexity, and requirements testing or functional verification. Such tests may also include other tests, such as unit tests, if testable requirements for such tests were provided by the software application supplier in operation 210. Although shown as two separate operations, depending on the programming language, interpretation in operation 215 and execution in operation 220 may both occur in the same operation, rather than sequentially.

Operation 225 asks whether the application passes the assessments, that is, if the supplier's application conforms to its testable requirements and passes the various functional requirements assessments as listed above. If not, then in operation 230, information as to what failed is generated and may be provided to the supplier, in which case the supplier may, after addressing any problems, resubmit its application code and/or testable requirements to the compliant software producer in operations 205 and 210. If the supplier's application conforms to its testable requirements, then in operation 235 validation documentation may be generated, including, for example, screen shots, code tracing, and validation certificate(s), as well as unit test results, if unit tests were performed in operation 220. In operation 240, the generated validation documentation may then be assembled into a validation portal for the supplier, including providing navigation links to the supplier. In operation 245, the supplier may then review the validation documentation on the validation portal, and e-sign the application, that is, provide a digital or electronic signature. If the supplier is already accredited, the compliant software producer may verify such status based on the electronic signature provided by the supplier. The supplier's signature may then be sent back to the validation portal in operation 250, and in operation 255, the validation portal may be frozen such that no further changes may be made. At this point, the validation portal includes all the material an auditor would need to perform a compliance audit, so that the supplier itself need not have a quality system of its own.

After the software is frozen and operating, operation 290 asks whether the application is still operating per requirements, that is, that the application requirements are still being met. This may also include requirements that were not able to be fully tested during validation, such as uptime, response time, and throughput. If so, the system continuously asks the question again after a set amount of time. If the application is not meeting requirements, in operation 292 the compliant software producer may check the standard operating procedures (SOPs), which may include actions to be taken if or when the software has certain errors. One of the results of checking the SOPs may be to alert the software application supplier in operation 294, in which case the supplier may review its application code and/or testable requirements and resubmit one or both to the compliant software producer in operations 205 and/or 210. Operations 290-294 may be considered to be part of continuous monitoring block 90 or validation block 20, depending on the regulatory system.

Besides the operations shown in FIG. 2, other operations or series of operations are contemplated to validate a software application. Moreover, the actual order of the operations in the flow diagram is not intended to be limiting, and the operations may be performed in any practical order. For example, operation 294 may occur before operation 292.

FIG. 3 is a flow diagram illustrating how a compliant software producer may prove-in a software application supplier's software application infrastructure according to an embodiment of the present invention. Although the supplier's regulatory application may be validated, it may not yet be able to be used in production for various reasons. For example, the infrastructure—the validated software plus whatever the software runs on—may also need to be validated. In operation 305, the compliant software producer may provide one or more infrastructure choices to the supplier via a browser. In operation 310, the supplier may then select from the infrastructure choices or may convey infrastructure requirements for its software. Infrastructure choices or requirements may include which language (Python, Ruby, C++, etc.) the web server runs, how powerful the server(s) are (e.g., how much throughput the servers may provide, how much capacity the servers may have, or how many end-users may need to be served), the types of databases used, and whether there is caching, load balancing, or other considerations related to hosting a supplier's application if it is web-based, or similar considerations if the application is deployed in a standalone mode. In operation 315, the supplier may provide its software to the compliant software producer. The supplier may also save and retain its selection of infrastructure choices for future use, e.g., SQL Server and C++, or Ruby and MySQL.

Based on the supplier's choices, the compliant software producer may put together a package and deploy it on a network, for example, a local or wide area network or the Internet ("into the cloud"), and host it. In more detail, in operation 320, the compliant software producer may use a hosting, provisioning, and deployment tool, also known as a recipe deployment tool, such as "Chef," which is a deployment language hosted by Amazon®, to build the supplier's instances and, in operation 325, deploy them (for example, put those instances on approved computing infrastructure and start running them). A "Chef Recipe" describes how to make a machine, and may then make the machine. This may create a virtual machine in Amazon's cloud.

At this point, all the materials needed for a regulatory-compliant application may be generated or logged. The compliant software producer may produce platform installation reports (PIRs) and other log information (traceability), which are proof that the software that is running in production is the same as what was run during validation. A PIR is the compliant software producer's proof that the application deployed is exactly what was to be deployed, and that the application works in production as previously validated (i.e., at operation 240). The proof or log(s) may go into the validation portal in operation 330 and may also go to the software application supplier in operation 335. In operation 340, the compliant software producer may compare the installation reports of the software that was validated in operation 240 and the software that is running in production in order to prove that what was validated is what is running in production. Besides the operations shown in FIG. 3, other operations or series of operations may be used to prove-in the infrastructure of a software application. Moreover, the actual order of the operations in the flow diagram is not intended to be limiting, and the operations may be performed in any practical order.

FIG. 4 is a flowchart illustrating how a compliant software producer may provide an audit trail for a supplier's software infrastructure according to an embodiment of the present invention. Such an audit trail may include evidence of operational change management. After validation and proving-in of infrastructure, audits of applications that are running in production may be required for compliance with certain rules of a regulatory system. To provide such evidence of operational change management, in operation 405, the supplier may transmit to an audit service all of the audits of the working applications. This audit service may be operated by the compliant software producer. The audit service may then acknowledge receipt of the audit in operation 410. In operation 415, the audit service may store the audits and, in operation 420, provide indexing for lookup. In operation 425, the audit service may guarantee that the audits have a number of attributes. Common attributes include that the audit is unchangeable, attributable, time-stamped (possibly based on an atomic clock), retrievable, and captures the reasons for change as required. The audit service may guarantee that the audit (or audit trail) will not disappear, and may replicate such audit or audit trail. Besides the operations shown in FIG. 4, other operations or series of operations may be used to provide auditing services for a software application. Moreover, the actual order of the operations in the flowchart is not intended to be limiting, and the operations may be performed in any practical order.

The previous embodiments are described in the setting of creating compliant software to be used in regulatory systems, including clinical trials for drugs or medical devices, trials for toxicology studies, and EDMS (electronic document management system). It is understood, however, that embodiments of the invention can be used in other fields involving compliance with rules in which software suppliers may wish to offer a software application, but it is not cost effective for them to make sure the application is compliant with rules promulgated by organizations such as public or private certification authorities, standards-setting organizations, or other rule-setting bodies.

The blocks shown in FIGS. 1A-1C are examples of modules that may comprise compliant software production system 10, and do not limit the blocks or modules that may be part of or connected to or associated with compliant software production system 10. For example, as mentioned before, validation block 20 may be visualized as being made up of test execution block 30, proving-in of software block 40, document generation for an auditor block 50, and electronic signing block 60. But those blocks indicate functions that may be performed while validating a supplier's software application, and are not rigid descriptions of functions required for validation. In addition, some regulatory systems may not require all of the blocks shown in FIGS. 1A-1C or in the same order, so, for example, software may be regulatory-compliant after completing just validation and proving-in of infrastructure, while providing evidence of operational change management may not be needed or performed or may be performed as part of a post-approval process. Similarly, continuous monitoring may not be required by the regulatory authority, may be performed as part of a post-approval process, or may be performed as part of a validation process. The blocks in FIGS. 1A-1C may generally be implemented in software or hardware or a combination of the two.

An example of an application that may be validated by use of the present invention would be a system that connects, via application programming interface(s) (API) to a hosted electronic health records (EHR) system to extract patient data and insert them into a clinical trial record. Such a system may make use of the platform data transport, clinical data management, and auditing functions of the invention. Another example of an application that may be validated by use of the present invention would be a system that receives data from a central lab, enters it into a clinical trial record but also performs statistical analysis on the data to identify correlations and trends in the data, surfacing that analytics only to key users (e.g., so as not to unblind the trial). Such a system may make use of platform data transport and transformation capabilities, auditing, clinical data management, data-permissions/visibility framework, graphing, and report generation and display. Yet another example of an application that may be validated by use of the present invention may be a system that converts data entry prompts and responses to and from Braille terminals so that electronic patient reported outcomes studies can be performed in blind and partially sighted populations. Such a system may make use of APIs to exchange data via the Internet, study metadata services (to read question prompts), and clinical data management and auditing functions for the entry of the data.

Some of the benefits of the present invention are that software application suppliers desiring to offer software solutions to be used in regulatory activities do not need to be well-versed in the regulatory agency's rules regarding electronic solutions or in rules regarding validation and testing of software and software infrastructure. This may be of a benefit to smaller software suppliers who have innovative applications to be used in the regulatory industry, but lack the training, manpower, resources, or economic means to learn and abide by the regulatory agency's rules regarding electronic solutions. The present invention also provides a platform and verified infrastructure with which the software can be used. The supplier provides to a compliant software producer the code and certain testable requirements that the software supplier wants to execute, and the compliant software producer validates the code by testing it and executing the testable requirements and, once the application works, freezing the application's development. Then the compliant software producer proves-in the infrastructure in which the application will be used according to the compliance rules. The compliant software producer, with knowledge of the auditing requirements, may then provide auditing services, such as evidence of operational change management and audit trails, to the software supplier that comply with those rules as well as continuous monitoring of the validated status. In addition, a compliant software producer may offer multi-region backups, redundant live data (mirroring), and other services to make data 100% available. In all of these cases, the supplier's software code need not be viewed by human eyes, and thus can remain the intellectual property of the supplier.

Compliant software production system 10 may be implemented on a network, for example, over the Internet as a cloud-based service or hosted service, which may be accessed through a standard web service API. This means that the compliant software production system can perform a regulatory-compliant validation of a software application and then issue all of the appropriate regulatory documentation. Implementation may also include offering a platform as a service that hosts the software application and is rule compliant.

The present invention differs from other systems that may host or offer software for sale. For example, those systems may have acceptance criteria, but do not (automatically) validate such software. Those systems may lack validation portals, may not provide proofs of quality, may not enforce minimum training requirements, may not provide ongoing testing of requirements via monitoring, and may not provide audit functions. The present invention may also provide digital signature verification of the software.

Aspects of the present invention may be embodied in the form of a system, a computer program product, or a method. Similarly, aspects of the present invention may be embodied as hardware, software or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code in embodiments of the present invention may be written in any suitable programming language. The program code may execute on a single computer, or on a plurality of computers. The computer may include a processing unit in communication with a computer-usable medium, wherein the computer-usable medium contains a set of instructions, and wherein the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method for producing regulatory-compliant software, comprising:
 validating a software application and freezing the validated software application in a validation portal;
 proving-in an infrastructure on which the software application operates wherein the proving-in of the infrastructure on which the software application operates comprises:
  receiving infrastructure requirements from a software application supplier;
  building the software application supplier's instances;
  logging an installation report to the validation portal; and
   comparing the log to the frozen, validated software in the validation portal; and
 providing evidence of operational change management for a regulatory agency, said evidence comprising documentation that satisfies compliance rules of the regulatory agency;
 wherein validating the software application comprises:
  receiving software code and testable requirements from a software application supplier;
  testing the software code to ensure that the testable requirements operate correctly; and
  generating documentation regarding the validation of the software application; and
 wherein proving-in an infrastructure comprises confirming that the software application operating on said infrastructure is the same as the validated software.

2. The method of claim 1, further comprising continuously monitoring the validated status of the software application.

3. The method of claim 1, wherein the software code and testable requirements include an electronic signature from the software application supplier.

4. The method of claim 1, wherein a recipe deployment tool is used to build the software application supplier's instances.

5. The method of claim 1, wherein evidence of operational change management comprises an audit trail.

6. The method of claim 1, wherein the validated software application is used in a clinical trial.

7. The method of claim 1, wherein the validated software application is used in a toxicology trial.

8. The method of claim 1, wherein the validated software application is hosted on a network.

9. The method of claim 1, wherein the validated software application is used on standalone computers.

10. The method of claim 1, wherein the regulatory agency is a standard-setting organization.

11. The method of claim 1, wherein the infrastructure comprises a language that runs the software application, the number of end-users served by the software application, the types of databases used by the software application, the existence of caching, the existence of load balancing by the software application, and whether the software application is web-based or deployed in a standalone mode.

12. A computer-implemented system for producing clinical trial software, comprising:
- a processor comprising a validation service and an audit service; and
- a platform configured to prove-in an infrastructure on which the software application operates, wherein the software application operating on said infrastructure is the same as the software application previously validated in a validation portal wherein the proving-in of the infrastructure on which the software application operates comprises:
  receiving infrastructure requirements from a software application supplier;
  building the software application supplier's instances;
  logging an installation report to the validation portal; and comparing the log to the frozen, validated software in the validation portal;
- wherein the validation service:
  is configured to validate a software application, freeze the validated software application in said validation portal, and generate documentation that satisfies compliance rules for said clinical trial software;
  receives software code and testable requirements from a software application supplier;
  tests the software code to ensure that the testable requirements operate correctly; and
  generates documentation regarding the validation of the software application; and
- wherein the audit service is configured to provide evidence of operational change management for a regulatory agency according to compliance rules of the regulatory agency.

13. The computer-implemented system of claim 12, wherein the validation service continuously monitors the validated status of the software application.

14. The computer-implemented system of claim 12, wherein the validated software application is hosted on a network.

15. The computer-implemented system of claim 12, wherein the infrastructure comprises a language that runs the software application, number of end-users served by the software application, the types of databases used by the software application, the existence of caching, the existence of load balancing by the software application, and whether the software application is web-based or deployed in a standalone mode.

16. A non-transitory computer readable storage medium, comprising computer executable instructions embodied therein, to be executed by a computer, for:
- validating a software application and freezing the validated software application in a validation portal;
- proving-in an infrastructure on which the software application operates, wherein the software application operating on said infrastructure is the same as the software application previously validated in said validation portal wherein the proving-in of the infrastructure on which the software application operates comprises:
  receiving infrastructure requirements from a software application supplier;
  building the software application supplier's instances;
  logging an installation report to the validation portal; and comparing the log to the frozen, validated software in the validation portal; and
- providing evidence of operational change management for a regulatory agency, said evidence comprising documentation that satisfies compliance rules of the regulatory agency;
- wherein validating the software application comprises:
  receiving software code and testable requirements from a software application supplier;
  testing the software code to ensure that the testable requirements operate correctly; and
  generating documentation regarding the validation of the software application.

17. The non-transitory computer readable storage medium of claim 16, further comprising computer executable instructions embodied therein, to be executed by a computer, for continuously monitoring the validated status of the software application.

18. The non-transitory computer readable storage medium of claim 16, wherein the infrastructure comprises a language that runs the software application, number of end-users served by the software application, the types of databases used by the software application, the existence of caching, the existence of load balancing by the software application, and whether the software application is web-based or deployed in a standalone mode.

* * * * *